United States Patent
Won (10) Patent No.: US 11,606,151 B2
(45) Date of Patent: Mar. 14, 2023

(54) ARRAY ANTENNA APPARATUS USING SPATIAL POWER SPECTRUM COMBINING AND METHOD OF CONTROLLING THE SAME

(71) Applicant: ELECTRONICS AND TELECOMMUNICATIONS RESEARCH INSTITUTE, Daejeon (KR)

(72) Inventor: You Sun Won, Daegu (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 329 days.

(21) Appl. No.: 17/072,834

(22) Filed: Oct. 16, 2020

(65) Prior Publication Data

US 2021/0119348 A1    Apr. 22, 2021

(30) Foreign Application Priority Data

Oct. 18, 2019  (KR) .......................... 10-2019-0130285
Sep. 16, 2020  (KR) .......................... 10-2020-0119491

(51) Int. Cl.
*H04B 17/13* (2015.01)
*H04B 17/24* (2015.01)
*H04B 17/318* (2015.01)

(52) U.S. Cl.
CPC ............. *H04B 17/13* (2015.01); *H04B 17/24* (2015.01); *H04B 17/318* (2015.01)

(58) Field of Classification Search
CPC ....................................................... H04B 17/13
See application file for complete search history.

(56) References Cited

U.S. PATENT DOCUMENTS 8,970,441 B2    3/2015    Fun et al.
9,964,631 B2    5/2018    Choi et al.
(Continued)

FOREIGN PATENT DOCUMENTS

KR    101468548 B1    12/2014
KR    101477909 B1    12/2014
(Continued)

*Primary Examiner* — Hsinchun Liao (57) ABSTRACT

Provided are an array antenna apparatus using spatial power spectrum combining and a method of controlling the same. The array antenna apparatus includes a uniform linear array antenna module including antennas which are uniformly and linearly arranged, an array antenna determiner configured to select sub-array antennas arranged at a first distance and sub-array antennas arranged at a second distance from the array antennas in the uniform linear array antenna module in order to derive spatial spectrum components from the uniform linear array antenna module, a spatial spectrum component deriver configured to separately derive spatial power spectrum components from signals received through the selected sub-array antennas selected by the array antenna determiner, and an azimuth calculator configured to calculate an azimuth by performing a calculation with a first spatial spectrum component and a second spatial spectrum component which are separately derived.

12 Claims, 7 Drawing Sheets

(56) References Cited

U.S. PATENT DOCUMENTS

| | | | |
|---|---|---|---|
| 2005/0064909 A1* | 3/2005 | Kim | H04B 7/0617 455/562.1 |
| 2008/0100499 A1* | 5/2008 | Nishimura | G01S 7/03 342/75 |
| 2014/0210666 A1* | 7/2014 | Maltsev | H01Q 3/40 343/893 |
| 2017/0338555 A1 | 11/2017 | Lee et al. | |
| 2021/0005983 A1* | 1/2021 | Yamaguchi | H01Q 21/24 |

FOREIGN PATENT DOCUMENTS

| | | |
|---|---|---|
| KR | 101731468 B1 | 4/2017 |
| KR | 101953697 B1 | 3/2019 |

* cited by examiner

ARRAY ANTENNA APPARATUS USING SPATIAL POWER SPECTRUM COMBINING AND METHOD OF CONTROLLING THE SAME

CROSS-REFERENCE TO RELATED APPLICATION

This application claims priority to and the benefit of Korean Patent Application Nos. 10-2019-0130285 and 10-2020-0119491, filed on Oct. 18, 2019 and Sep. 16, 2020, the disclosure of which are incorporated herein by reference in its entirety.

BACKGROUND

1. Field of the Invention

The present invention relates to an array antenna apparatus using spatial power spectrum combining and, more particularly, to an array antenna apparatus with improved the angular resolution and grating lobe characteristics of a radar using spatial power spectrum combining.

2. Discussion of Related Art

In general, a radar transmits a signal generated according to system requirements through an antenna, senses a echo signal which returns after being reflected by a target using the antenna and a receiver, and detects the distance, speed, angle, etc. with respect to the target through signal processing.

According to the waveform of a signal, radars are generally classified as pulsed radars or continuous waveform radars. Among continuous waveform radars, a frequency modulated continuous waveform (FMCW) radar, which employs a signal of which a frequency is modulated over time, is frequently used.

The FMCW radar estimates the distance to a target according to a beat frequency component which is the difference between a transmitted signal and a received signal, derives the travel speed of the target from a Doppler frequency component, and derives the angle with the target from the phase difference between received signals in a receiving antenna array.

However, in order to increase the angular resolution of an existing array antenna, it is necessary to reduce the −3 dB beam width of an array antenna response. Accordingly, it is necessary to increase the number or distance between receiving antennas. However, an increase in the number of antennas is limited by a receiving circuit configuration and the amount of signal processing calculation, and an increase in the distance between antennas is limited because a main lobe and grating lobes become close to each other.

SUMMARY OF THE INVENTION

The present invention is directed to providing an array antenna apparatus using spatial power spectrum combining which allows the angle with respect to a target to be derived through a multiplication operation of components of a beamforming spatial power spectrum for a short-distance arrangement and a spatial power spectrum for a long-distance arrangement in order to increase an angular resolution without an increase in the number of antennas and to reduce grating lobes.

Objects of the present invention is not limited to those mentioned above, and other objects which have not been mentioned will be clearly understood by those of ordinary skill in the art from the following description.

According to an aspect of the present invention, there is provided an array antenna apparatus using spatial power spectrum combining, the apparatus including a uniform linear array antenna module including antennas which are uniformly and linearly arranged, an array antenna determiner configured to select sub-array antennas arranged at a first distance and sub-array antennas arranged at a second distance from the array antennas in the uniform linear array antenna module in order to derive spatial spectrum components from the uniform linear array antenna module, a spatial spectrum component deriver configured to separately derive spatial power spectrum components from signals received through the selected sub-array antennas selected by the array antenna determiner, and an azimuth calculator configured to calculate an azimuth by performing a calculation with a first spatial spectrum component and a second spatial spectrum component which are separately derived.

The azimuth calculator may calculate the azimuth through a multiplication operation of the first spatial power spectrum component and the second spatial power spectrum component.

The uniform linear array antenna module may include a plurality of first antennas which are uniformly and linearly arranged at the first distance and an $(n+1)^{th}$ antenna provided at the second distance from the last one of the first antennas.

The array antenna determiner may set the first distance to $0.5\lambda$ and set the second distance to double the first distance.

The array antenna determiner may determine a plurality of array antennas which are arranged at one or more distances to derive a plurality of spatial spectrum components, and the azimuth calculator may calculate the azimuth through a multiplication operation of the plurality of spatial power spectrum components.

According to another aspect of the present invention, there is provided a method of controlling array antennas using spatial power spectrum combining, the method including receiving signals from a uniform linear array antenna module including antennas which are uniformly and linearly arranged, selecting sub-array antennas arranged at a first distance and sub-array antennas arranged at a second distance in order to derive spatial spectrum components from the uniform linear array antenna module, separately deriving spatial power spectrum components from the signals received through the selected sub-array antennas, and calculating an azimuth by performing a calculation with a first spatial spectrum component and a second spatial spectrum component which are separately derived.

The calculating of the azimuth may include calculating the azimuth through a multiplication operation of the first spatial power spectrum component and the second spatial power spectrum component.

The uniform linear array antenna module may include a plurality of first antennas which are uniformly and linearly arranged at the first distance and an (n+1)th antenna provided at the second distance from the last one of the first antennas.

The first distance of the array antennas may be set to $0.5\lambda$, and the second distance of the array antennas may be set to double the first distance.

The selecting of the sub-array antennas may include determining a plurality of array antennas which are arranged at one or more distances to derive a plurality of spatial spectrum components, and the calculating of the azimuth may include calculating the azimuth through a multiplication operation of the plurality of spatial power spectrum components calculated through the plurality of determined array antennas.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods for achieving them will be made clear from exemplary embodiments described below in detail with reference to the accompanying drawings. However, the present invention is not limited to the exemplary embodiments disclosed below and can be embodied in various different forms. The embodiments are provided so that this disclosure of the present invention will be thorough and complete and will fully convey the scope of the invention to those of ordinary skill in the art. The present invention is defined by the claims. Terminology used in this specification is for the purpose of describing the embodiments and is not intended to limit the present invention. In this specification, the singular forms include the plural forms as well unless the context clearly indicates otherwise. The terms "comprise" and/or "comprising" when used herein do not preclude the presence or addition of one or more elements, steps, operations, and/or devices other than stated elements, steps, operations, and/or devices.

Figure 1:
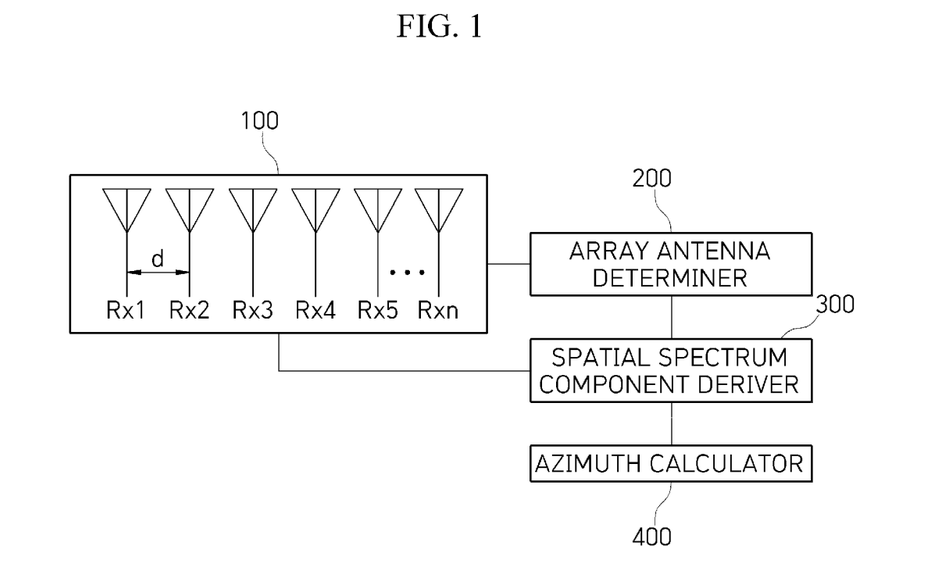
FIG. 1 is a block diagram illustrating an array antenna apparatus using spatial power spectrum combining according to an exemplary embodiment of the present invention.

FIG. 1 is a block diagram illustrating an array antenna apparatus using spatial power spectrum combining according to an exemplary embodiment of the present invention.

As shown in FIG. 1, the array antenna apparatus using spatial power spectrum combining according to the exemplary embodiment of the present invention includes a uniform linear array antenna module 100, an array antenna determiner 200, a spatial spectrum component deriver 300, and an azimuth calculator 400.

Figure 2:
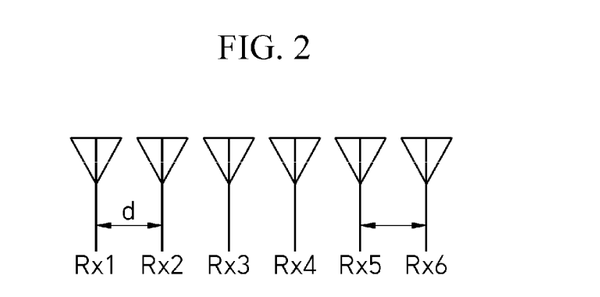
FIG. 2 is a diagram illustrating an example of array antennas provided in a uniform linear array antenna module of FIG. 1.

The uniform linear array antenna module 100 includes antennas which are uniformly and linearly arranged as shown in FIG. 2. The uniform linear array antenna module 100 corresponds to a plurality of first antennas which are uniformly and linearly arranged at a first distance.

Figure 3:
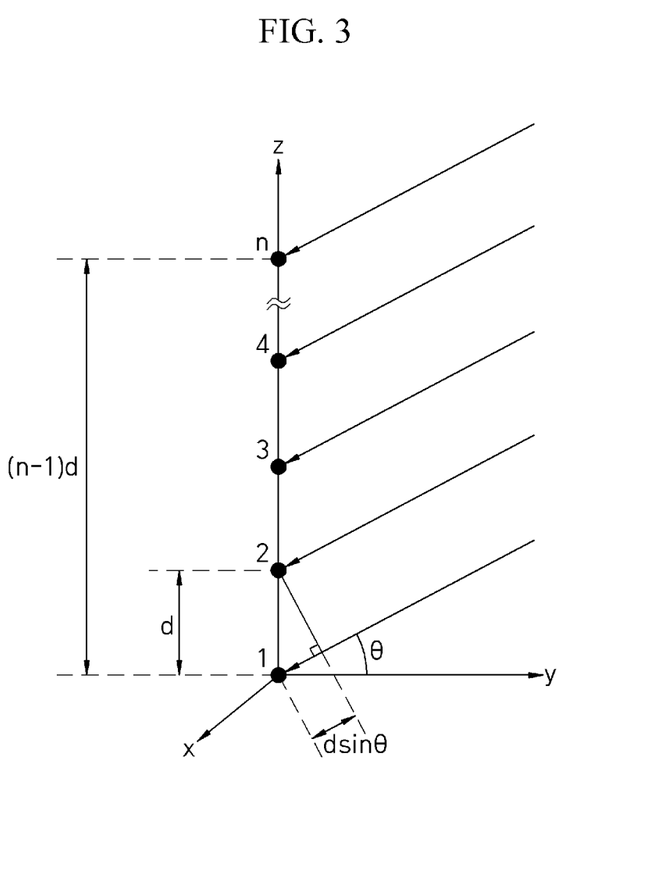
FIG. 3 is a reference diagram illustrating an example of signal receiving of the uniform linear array antenna module of FIG. 1.

FIG. 3 is a reference diagram illustrating an example of signal receiving of the uniform linear array antenna module of FIG. 1.

As shown in FIG. 3, when the number of receiving antennas is N and the distance between antennas is d in the uniform linear array antenna module 100 and the direction to a target is 0, the main lobe, side lobe, null, grating lobe, and beam width of an array antenna beam pattern are represented by [Equation 1], [Equation 2], [Equation 3], [Equation 4], and [Equation 5], respectively.

$$\theta_m = \sin^{-1}\left(\pm\frac{\lambda m}{d}\right); m = 0, 1, 2, \ldots \qquad \text{[Equation 1]}$$

$$\theta_l = \sin^{-1}\left(\pm\frac{\lambda}{2d}\frac{2l+1}{N}\right); l = 1, 2, 3 \ldots \qquad \text{[Equation 2]}$$

$$\theta_n = \sin^{-1}\left(\pm\frac{\lambda}{d}\frac{n}{N}\right); \begin{array}{l} n = 1, 2, 3 \ldots \\ n \neq N, 2N, \ldots \end{array} \qquad \text{[Equation 3]}$$

$$|\sin\theta - \sin\theta_0| = \pm\frac{\lambda n}{d}; n = 1, 2, 3, \ldots \qquad \text{[Equation 4]}$$

$$2|\theta_m - \theta_h|, \text{ where } \theta_h = \sin^{-1}\left(\frac{\lambda}{2\pi d}\frac{2.782}{N}\right) \qquad \text{[Equation 5]}$$

An angular resolution increases as the −3 dB beam width of the main lobe in an antenna beam pattern decreases, and thus it is necessary to increase the distance d or the number N of antennas. However, the number of antennas is equal to the number of receiving channels. Accordingly, an increase in the number of antennas leads to an increase in hardware and calculation costs. Also, when the antenna distance increases, a grating lobe may appear in a desired field of view (FoV) according to [Equation 4]. In [Equation 4], θ0 is the steering angle of the main lobe. When d is 0.5λ or less, no grating lobe is generated in an FoV within ±90°.

$$x(t) = \begin{bmatrix} x_1(t) \\ x_2(t) \\ \vdots \\ x_N(t) \end{bmatrix} = \begin{bmatrix} 1 & 1 & \cdots & 1 \\ e^{j\mu_1} & e^{j\mu_2} & \cdots & e^{j\mu_M} \\ \vdots & \vdots & \ddots & \vdots \\ e^{j(N-1)\mu_1} & e^{j(N-1)\mu_2} & \cdots & e^{j(N-1)\mu_M} \end{bmatrix} \qquad \text{[Equation 6]}$$

-continued $$\begin{bmatrix} s_1(t) \\ s_2(t) \\ \vdots \\ s_M(t) \end{bmatrix} + n(t) = \begin{bmatrix} a(\mu_1) & a(\mu_2) & \dots & a(\mu_M) \end{bmatrix} \begin{bmatrix} s_1(t) \\ s_2(t) \\ \vdots \\ s_M(t) \end{bmatrix} + n(t) =$$

$$\text{As} + n(t), \mu_i = -\frac{2\pi}{\lambda} d \sin\theta_i$$

$$y(t) = \sum_{i=1}^{N} w_i^* x(t) = w^H x(t) \quad \text{[Equation 7]}$$

$$P(w) = E\left[|y(t)|^2\right] = w^H x(t) x^H(t) w = \quad \text{[Equation 8]}$$

$$w^H R_{xx} w = \frac{1}{K} \sum_{k=1}^{K} |y(t_k)|^2 = \frac{1}{K} \sum_{k=1}^{K} w^H x(t_k) x^H(t_k) w = w^H \hat{R}_{xx} w$$

When the number of receiving antennas is N and the number of echo signals which return after being reflected by the target is M, a received signal may be represented by x(t) as shown in [Equation 6], and a signal y(t) directed by the linear output of antenna outputs which have a weight w given to each antenna element is represented by [Equation 7]. Accordingly, a spatial power spectrum P(w) derived through beamforming may be represented by [Equation 8]. K in [Equation 8] is the number of samples of receiving signals.

In conventional beamforming (CBF), to find a location at which the spatial power spectrum shows a maximum value by directing array antennas, a(θ) of [Equation 6] is normalized to a size of 1 and applied to a weight wCBF of [Equation 9]. A spatial power spectrum PCBF obtained accordingly is represented by [Equation 10]

$$w_{CBF} = \frac{a(\theta)}{\sqrt{a^H(\theta)a(\theta)}} \quad \text{[Equation 9]}$$

$$P_{CBF}(\theta) = \frac{a^H(\theta)Ra(\theta)}{a^H(\theta)a(\theta)} \quad \text{[Equation 10]}$$

The performance of CBF is determined by the distance, number, etc. of antennas according to responses of array antennas represented in [Equation 1] to [Equation 5], and thus a method is necessary to increase the angular resolution while minimizing undesired grating lobes.

Figure 4:
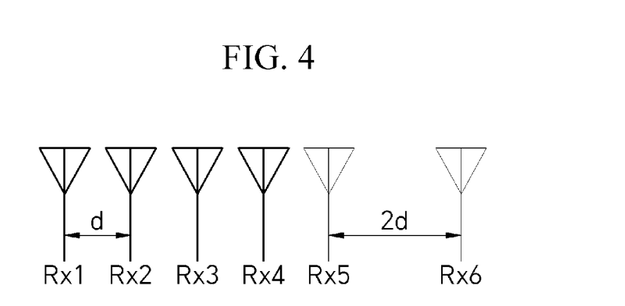
FIG. 4 is a reference diagram illustrating array antennas selected for an angular resolution in the uniform linear array antenna module of FIG. 1.
Figure 5:
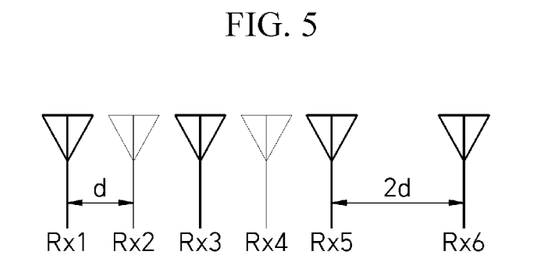
FIG. 5 is a reference diagram illustrating array antennas selected for grating lobe suppression in the uniform linear array antenna module of FIG. 1.

To derive spatial spectrum components from the uniform linear array antenna module 100, the array antenna determiner 200 selects sub-array antennas which are arranged at the first distance and intended for an angular resolution and sub-array antennas which are arranged at a second distance and intended for grating lobe suppression. The first distance of the sub-array antennas for an angular resolution may be 0.5λ as shown in FIG. 4, and the second distance of the sub-array antennas for grating lobe suppression may be λ which is double the first distance as shown in FIG. 5.

The spatial spectrum component deriver 300 separately derives spatial power spectrum components from signals received through the sub-array antennas selected by the array antenna determiner 200.

The azimuth calculator 400 calculates an azimuth by performing a calculation with a first spatial spectrum component and a second spatial spectrum component which are separately derived above. The azimuth calculator 400 may calculate the azimuth through a multiplication operation of components of first and second spatial power spectra.

According to the exemplary embodiment of the present invention, it is possible to simultaneously obtain narrow main lobe and low grating lobe characteristics through a multiplication operation of components of a spatial power spectrum obtained from a first-distance array through beamforming and a spatial power spectrum obtained from a second-distance array through beamforming.

Also, according to the exemplary embodiment of the present invention, it is possible to simultaneously increase an angular resolution and reduce grating lobes by adjusting the distance between antennas without a change in the number of antennas.

In the exemplary embodiment of the present invention, receiving channels include six antennas, and the antennas are arranged at a distance of 0.5λ in which no grating lobe is generated and a distance of 1λ for increasing an angular resolution. The number and distances of antennas are randomly selected for verification through a simulation and may be changed as necessary.

Among the six array antennas, spatial power spectra are calculated with respect to the four array antennas of receiving channels 1, 2, 3, and 4, and spatial power spectra are calculated with respect to the four array antennas of receiving channels 1, 3, 5, and 6. It is possible to simultaneously obtain a narrow main lobe characteristic from the 1λ-distance array and obtain a low grating lobe characteristic from the 0.5λ-distance array through a multiplication operation of components of the spatial power spectra.

Figure 6:
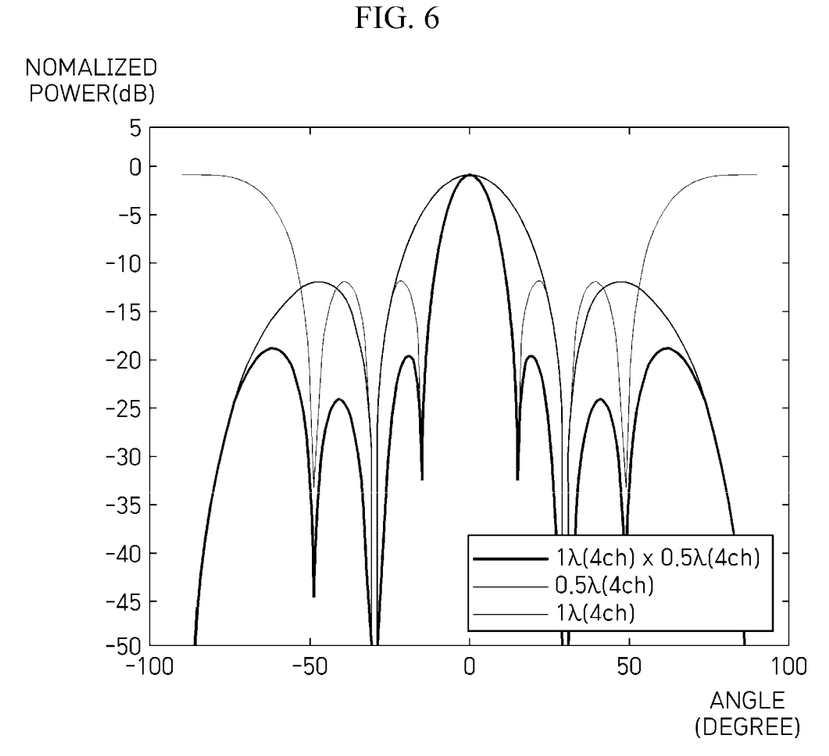
FIG. 6 is a reference diagram illustrating an example of spatial power spectrum results according to the exemplary embodiment of the present invention when one target is positioned at 0 degrees.

FIG. 6 is a reference diagram illustrating an example of spatial power spectrum results according to the exemplary embodiment of the present invention when one target is positioned at 0 degrees.

In FIG. 6, the alternating long and short dashed line indicates a spatial power spectrum with respect to the four array antennas (0.5λ distance) of receiving channels 1, 2, 3, and 4 of FIG. 4, the dotted line indicates a spatial power spectrum with respect to the four array antennas (1λ distance) of receiving channels 1, 3, 5, and 6 of FIG. 5, and the solid line indicates the component product of the two spatial power spectra.

When the distance is 0.5λ, there is no grating lobe, but the main lobe has a large width, and when the distance is 1λ, the main lobe has a narrow width, but grating lobes are generated within ±90°.

However, as for the component product of the two spatial power spectra, it is possible to see that the main lobe has a similar width to the case of the distance being 0.5λ, and grating lobes are reduced.

Figure 7:
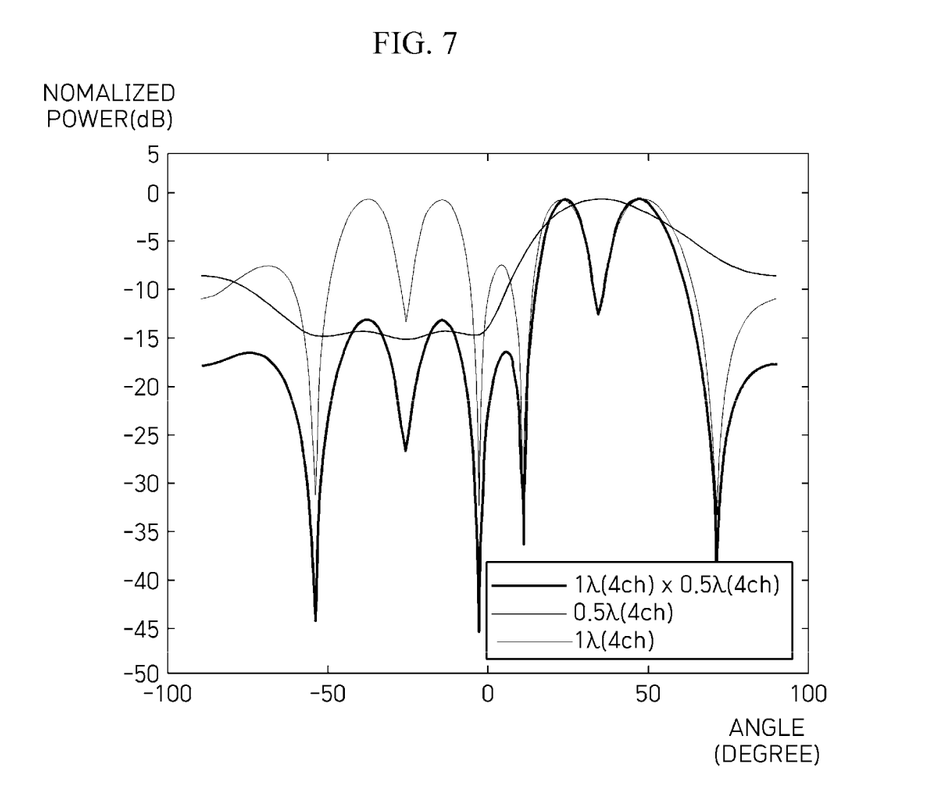
FIG. 7 is a reference diagram illustrating an example of spatial power spectrum results derived through beamforming according to the exemplary embodiment of the present invention when two targets are positioned at 20 degrees and 40 degrees.

FIG. 7 is a reference diagram illustrating an example of spatial power spectrum results derived through beamforming according to the exemplary embodiment of the present invention when two targets are positioned at 20 degrees and 40 degrees.

In FIG. 7, the alternating long and short dashed line indicates a spatial power spectrum with respect to the four array antennas (0.5λ distance) of receiving channels 1, 2, 3, and 4 of FIG. 4, the dotted line indicates a spatial power spectrum with respect to the four array antennas (1λ distance) of receiving channels 1, 3, 5, and 6 of FIG. 5, and the solid line indicates the component product of the two spatial power spectra.

As for a case in which two targets are present at positions other than 0 degrees, when the distance is 0.5λ, there is no grating lobe, but it is not possible to distinguish between the two targets because the main lobe has a large width. When the distance is 1λ, it is possible to distinguish between the two targets because the main lobe has a narrow width, but grating lobes are generated near the main lobe.

However, as for the component product of the two spatial power spectra, it is possible to distinguish between the two targets because the main lobe has a similar width to the case of the distance being 0.5λ, and also grating lobes are reduced.

Figure 8:
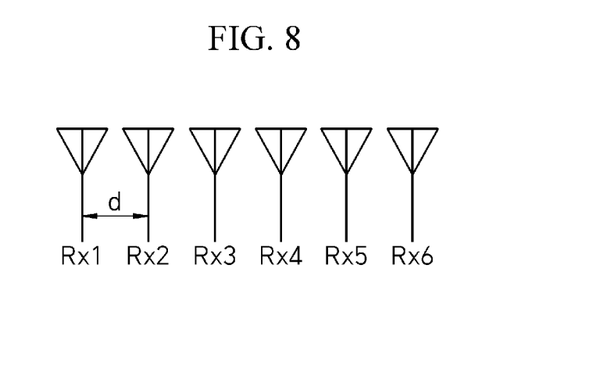
FIG. 8 is a reference diagram illustrating an antenna in which receiving array antennas are arranged at a distance of 0.5λ.
Figure 9:
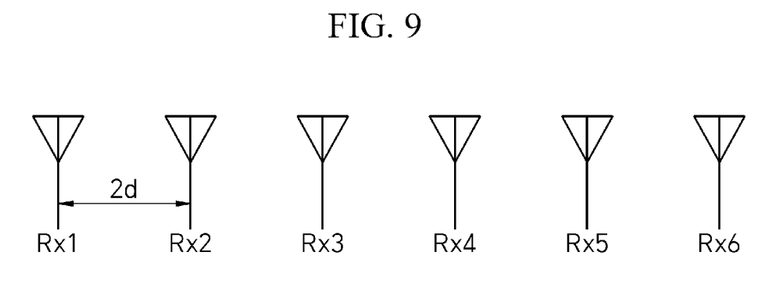
FIG. 9 is a reference diagram illustrating an antenna in which receiving array antennas are arranged at a distance of 1λ.

Meanwhile, for comparison between spectrum results, FIG. 8 is a reference diagram illustrating an antenna in which receiving array antennas are arranged at a distance of 0.5λ, and FIG. 9 is a reference diagram illustrating an antenna in which receiving array antennas are arranged at a distance of 1λ.

Figure 10:
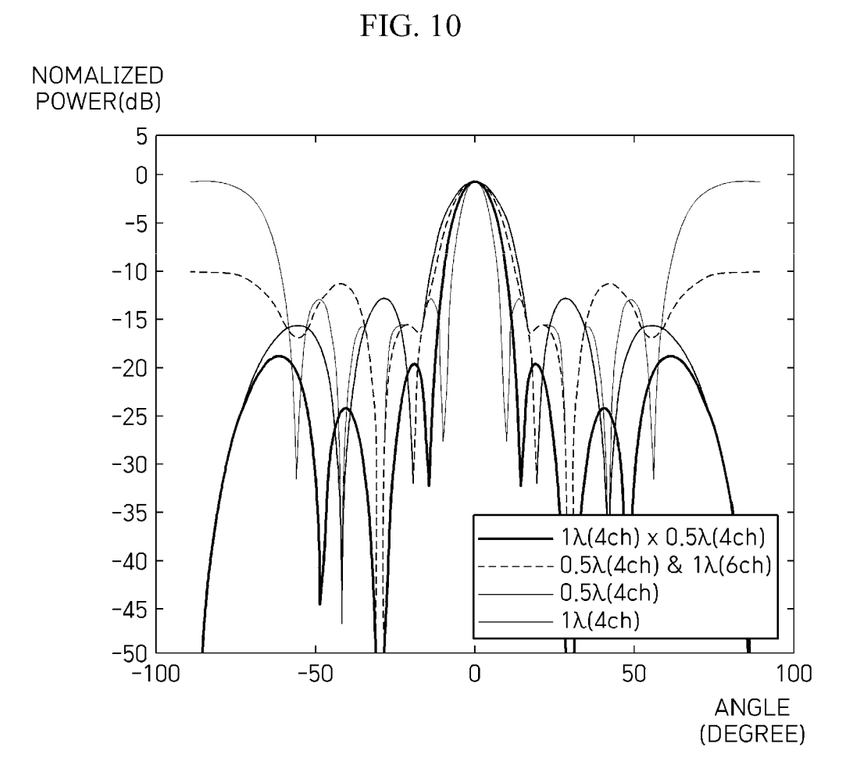
FIG. 10 is a reference diagram illustrating spatial power spectrum results derived through beamforming of a general uniform linear array antenna and a uniform linear array antenna of the present invention when one target is positioned at 0 degrees.

FIG. 10 is a reference diagram illustrating spatial power spectrum results derived through beamforming of a general uniform linear array antenna and a uniform linear array antenna of the present invention when one target is positioned at 0 degrees.

In FIG. 10, the alternating long and short dashed line indicates a spatial power spectrum with respect to the six array antennas (0.5λ distance) of receiving channels 1 to 6 of FIG. 8, the dotted line indicates a spatial power spectrum with respect to the six array antennas (1λ distance) of receiving channels 1 to 6 of FIG. 9, and the chain line indicates a spatial power spectrum with respect to the six array antennas (a combination of 0.5λ distance and 1λ distance) of receiving channels 1 to 6 of FIGS. 8 and 9.

Also, the solid line indicates the component product of the two spatial power spectra with respect to the four array antennas of FIGS. 4 and 5. When the distance is 0.5λ, there is no grating lobe, but the main lobe has the widest width, and when the distance is 1λ, the main lobe has the narrowest width, but grating lobes are generated within ±90°.

As for the combination of 0.5λ distance and 1λ distance, the main lobe has the widest width next to the uniform array with 0.5λ distance, and small grating lobes are generated within ±90°.

However, as for the component product of the two spatial power spectra with respect to the four array antennas, the main lobe has the narrowest width next to the uniform array with 1λ distance, and no grating lobe is generated.

Figure 11:
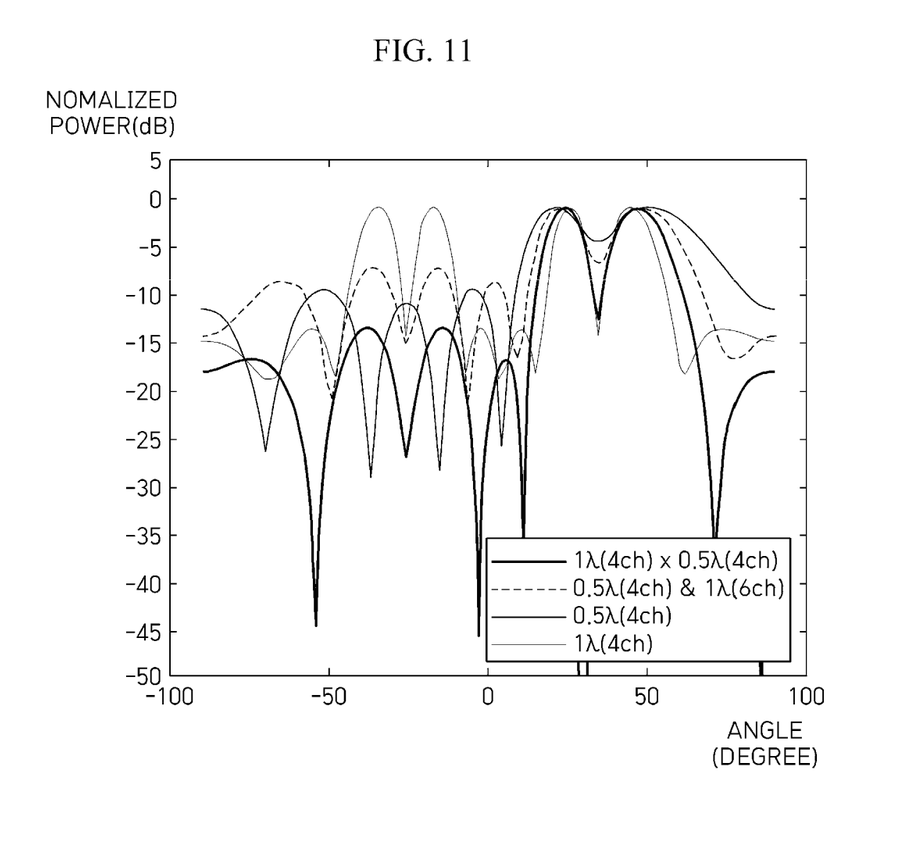
FIG. 11 is a reference diagram illustrating spatial power spectrum results derived through beamforming of a general uniform linear array antenna and a uniform linear array antenna of the present invention when two targets are positioned at 20 degrees and 40 degrees.

FIG. 11 is a reference diagram illustrating spatial power spectrum results derived through beamforming of a general uniform linear array antenna and a uniform linear array antenna of the present invention when two targets are positioned at 20 degrees and 40 degrees.

In FIG. 11, the alternating long and short dashed line indicates a spatial power spectrum with respect to the six array antennas (0.5λ distance) of receiving channels 1 to 6 of FIG. 8, the dotted line indicates a spatial power spectrum with respect to the six array antennas (1λ distance) of receiving channels 1 to 6 of FIG. 9, and the chain line indicates a spatial power spectrum with respect to the six array antennas (a combination of 0.5λ distance and 1λ distance) of receiving channels 1 to 6 of FIGS. 8 and 9.

Also, the solid line indicates the component product of the two spatial power spectra with respect to the four array antennas of FIGS. 4 and 5. When the distance is 0.5λ, there is no grating lobe, but the main lobe has the widest width, and when the distance is 1λ, the main lobe has the narrowest width, but grating lobes are generated near the main lobe.

As for the combination of 0.5λ distance and 1λ distance, the main lobe has the widest width next to the uniform array with 0.5λ distance, and small grating lobes are generated near the main lobe.

However, as for the component product of the two spatial power spectra with respect to the four array antennas, the main lobe has the narrowest width next to the uniform array with 1λ distance, and no grating lobe is generated.

Meanwhile, according to another exemplary embodiment of the present invention, an array antenna determiner may determine a plurality of array antennas which are arranged at one or more distances so that a plurality of spatial spectrum components may be derived, and an azimuth calculator may calculate an azimuth through a multiplication operation of the plurality of spatial power spectrum components.

Figure 12:
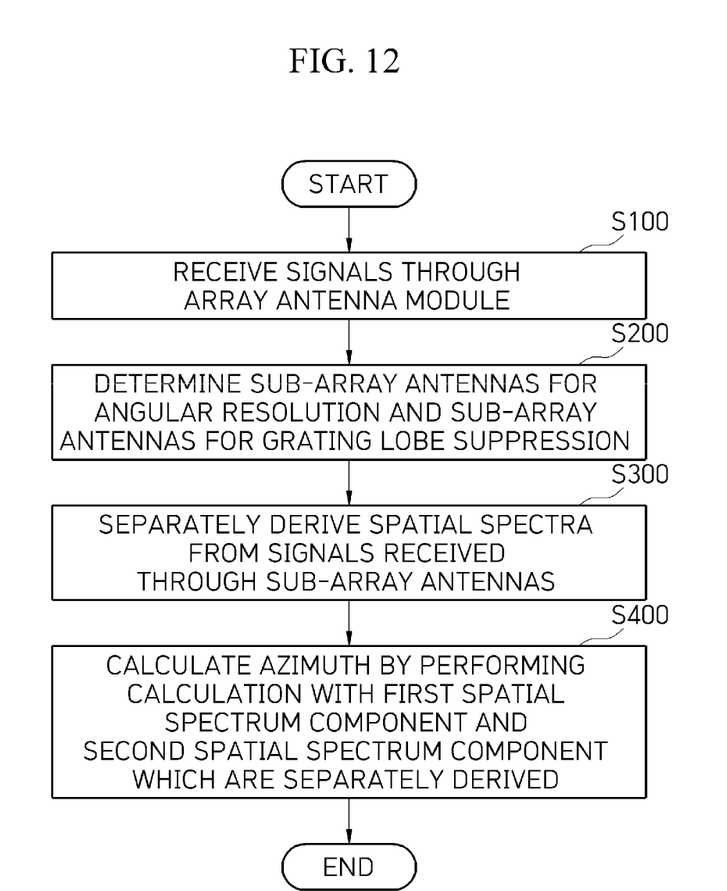
FIG. 12 is a flowchart illustrating a method of controlling array antennas using spatial power spectrum combining according to an exemplary embodiment of the present invention.

FIG. 12 is a flowchart illustrating a method of controlling array antennas using spatial power spectrum combining according to an exemplary embodiment of the present invention.

As shown in FIG. 12, signals are received from a uniform linear array antenna module including antennas which are uniformly and linearly arranged (S100).

Subsequently, sub-array antennas which are arranged at a first distance and intended for an angular resolution and sub-array antennas which are arranged at a second distance and intended for grating lobe suppression are selected to derive spatial spectrum components from the uniform linear array antenna module (S200). In the operation S200 of selecting array antennas, the first distance of the array antennas may be set to 0.5λ, and the second distance of the array antennas may be set to double the first distance.

Subsequently, spatial power spectrum components are derived from signals received through the selected sub-array antennas (S300).

Subsequently, an azimuth is calculated by performing a calculation with a first spatial spectrum component and a second spatial spectrum component (S400). In the operation S400 of calculating an azimuth, the azimuth may be calculated through a multiplication operation of the first and second spatial power spectrum components.

The operation S100 of receiving signals from the uniform linear array antenna module may employ a plurality of first antennas which are uniformly and linearly arranged at the first distance and an (n+1)th antenna provided at the second distance from the last one of the first antennas.

Meanwhile, in a method of controlling array antennas using spatial power spectrum combining according to another exemplary embodiment of the present invention, the operation S200 of selecting array antennas may include an operation of determining a plurality of array antennas which are arranged at one or more distances so that a plurality of spatial spectrum components may be derived, and the operation S400 of calculating an azimuth may include an operation of calculating the azimuth through a multiplication operation of the plurality of spatial power spectrum components calculated through the plurality of determined array antennas.

According to the exemplary embodiment of the present invention, it is possible to simultaneously obtain narrow main lobe and low grating lobe characteristics through a multiplication operation of components of a spatial power spectrum obtained from a first-distance array through beamforming and a spatial power spectrum obtained from a second-distance array through beamforming.

Although the embodiments of the present invention have been described in detail above with reference to the accompanying drawings, the embodiments are exemplary. Various modifications and alterations can be made by those of ordinary skill in the art within the technical spirit of the present invention. Therefore, the scope of the present invention is not limited to the above-described embodiments and should be defined by the following claims.

What is claimed is:

1. An array antenna apparatus using spatial power spectrum combining, the array antenna apparatus comprising:
   a uniform linear array antenna module including antennas which are uniformly and linearly arranged;
   an array antenna determiner configured to select sub-array antennas arranged at a first distance and sub-array antennas arranged at a second distance from the array antennas in the uniform linear array antenna module in order to derive spatial spectrum components from the uniform linear array antenna module;
   a spatial spectrum component deriver configured to separately derive spatial power spectrum components from signals received through the selected sub-array antennas selected by the array antenna determiner; and
   an azimuth calculator configured to calculate an azimuth by performing a calculation with a first spatial spectrum component and a second spatial spectrum component which are separately derived.

2. The array antenna apparatus of claim 1, wherein the azimuth calculator calculates the azimuth through a multiplication operation of the first spatial power spectrum component and the second spatial power spectrum component.

3. The array antenna apparatus of claim 1, wherein the uniform linear array antenna module includes:
   a plurality of first antennas which are uniformly and linearly arranged at the first distance; and
   an $(n+1)^{th}$ antenna provided at the second distance from a last one of the first antennas.

4. The array antenna apparatus of claim 1, wherein the array antenna determiner sets the first distance to $0.5\lambda$.

5. The array antenna apparatus of claim 4, wherein the array antenna determiner sets the second distance to double the first distance.

6. The array antenna apparatus of claim 1, wherein the array antenna determiner determines a plurality of array antennas which are arranged at one or more distances to derive a plurality of spatial spectrum components; and
   the azimuth calculator calculates the azimuth through a multiplication operation of the plurality of spatial power spectrum components.

7. A method of controlling array antennas using spatial power spectrum combining, the method comprising:
   receiving signals from a uniform linear array antenna module including antennas which are uniformly and linearly arranged;
   selecting sub-array antennas arranged at a first distance and sub-array antennas arranged at a second distance to derive spatial spectrum components from the uniform linear array antenna module;
   separately deriving spatial power spectrum components from the signals received through the selected sub-array antennas; and
   calculating an azimuth by performing a calculation with a first spatial spectrum component and a second spatial spectrum component which are separately derived.

8. The method of claim 7, wherein the calculating of the azimuth comprises calculating the azimuth through a multiplication operation of the first spatial power spectrum component and the second spatial power spectrum component.

9. The method of claim 7, wherein the uniform linear array antenna module includes:
   a plurality of first antennas which are uniformly and linearly arranged at the first distance; and
   an (n+1)th antenna provided at the second distance from a last one of the first antennas.

10. The method of claim 7, wherein the first distance of the array antennas is set to $0.5\lambda$.

11. The method of claim 10, wherein the second distance of the array antennas is set to double the first distance.

12. The method of claim 7, wherein the selecting of the sub-array antennas comprises determining a plurality of array antennas which are arranged at one or more distances to derive a plurality of spatial spectrum components, and the calculating of the azimuth comprises calculating the azimuth through a multiplication operation of the plurality of spatial power spectrum components calculated through the plurality of determined array antennas.

* * * * *